United States Patent [19]

Nakajima et al.

[11] 3,764,747

[45] Oct. 9, 1973

[54] BILLING SYSTEM IN MOBILE COMMUNICATION

[75] Inventors: Hisao Nakajima, Musashino; Takashi Suzuki, Kamakura; Takuya Hokawa, Totsuka, Yokohama, all of Japan

[73] Assignees: Hitachi, Ltd.; Japanese National Railways, both of Tokyo, Japan

[22] Filed: Apr. 13, 1971

[21] Appl. No.: 133,532

[30] Foreign Application Priority Data

Apr. 17, 1970 Japan ............................ 45/32333

[52] U.S. Cl. ................................ 179/7 R, 179/1 VE

[51] Int. Cl. ........................................ H04m 15/18

[58] Field of Search ............ 179/7 R, 7 MM, 1 VE, 179/2 E, 2.5 B, 41 R, 41 A, 7.1 R; 325/51, 53, 54; 343/177

[56] References Cited

UNITED STATES PATENTS

| | | | |
|---|---|---|---|
| 2,607,887 | 8/1952 | Gissler et al. | 179/1 VE |
| 3,555,424 | 1/1971 | Malm | 179/41 A |
| 2,737,578 | 3/1956 | Bartelink | 325/53 |
| 3,517,315 | 6/1970 | Malm | 179/1 VE |
| 3,431,363 | 3/1969 | Miller | 179/41 R |

*Primary Examiner*—William C. Cooper
*Assistant Examiner*—Kenneth D. Baugh
*Attorney*—Craig, Antonelli & Hill

[57] ABSTRACT

In a mobile communication system wherein connection is provided between a vehicle and an ordinary telephone network through one of the radio base stations which are installed within a district in which the vehicle passes the radio base station being connected to an exchange station associated with the telephone network, a billing system in mobile communication, wherein an out-band signal is sent from the vehicle to an exchange equipment in the exchange station whereupon a second out-band signal is sent from the exchange equipment to the vehicle so that, only while the second out-band signal is being received, measurement of time and billing are carried out in the vehicle, and wherein a billing classification is discriminated on the basis of a dial signal sent from the vehicle and the result of the discrimination is sent from the exchange equipment to the vehicle in the form of a voice-band multifrequency signal, also serving as a response signal, so that the condition for the billing is set in the vehicle.

3 Claims, 3 Drawing Figures

INVENTORS
HISAO NAKAJIMA,
TAKASHI SUZUKI and
TAKUYA HOKAWA

BY Craig, Antonelli & Hill
ATTORNEY

INVENTORS
HISAO NAKAJIMA,
TAKASHI SUZUKI and
TAKUYA HOKAWA

BY Craig, Antonelli & Hill
ATTORNEY

BILLING SYSTEM IN MOBILE COMMUNICATION

BACKGROUND OF THE INVENTION

1. Field of the Invention

This invention relates to a billing system for collecting the charge for a telephone call in the so-called mobile radio telephone communication system in which a vehicle carrying radio telephone equipment thereon is connected with ordinary subscription telephone facilities through one of a plurality of radio base stations so that continuity of communications is ensured with passage of the movable object.

2. Description of the Prior Art

In the service between a public telephone set installed on a vehicle, such as a train and a car, and an ordinary telephone network, a system has been put into practice in which a telephone operator is situated between them to effect the manual connection. Since the service is a communication with the moving object, instantaneous interruptions of radio waves occur, e.g. by standing waves, with the movement of the vehicle. Moreover, the range of radio waves is subject to limitation, resulting in the necessity for switching radio stations and connection paths during connection. As a result, it is inevitable that the interruption and discontinuity of communication increases when compared with the case, as in the ordinary telephone network, where once the connection has been provided, the transmission line and equipment in use are not switched. Accordingly, when the connecting operation is automated, a method for eliminating the fee for a telephone call in the case of a talking interruption will be a serious problem. This is the most important reason why the manual system has been employed. Automation, however, is desirable for economical reasons such as personnel expenses.

SUMMARY OF THE INVENTION

An object of this invention is to provide a stable billing system for the mobile communication system as described above.

More specifically, an object of this invention is to provide a billing system wherein a coin-box telephone set of the automatic no-delay base is mounted on a movable object, and wherein measurement of time and billing are performed on the vehicle while an outband signal is being received. The out-band signal is sent from the exchange equipment on the ground, while another out-band signal sent from the vehicle signal is received and connection is established in the exchange equipment on the ground. As a result, highly reliable billing is conducted in a way to prevent any charge from being summed up at an instantaneous interruption or disconnection of the communication.

Another object of this invention is to provide a billing system wherein in conducting billing, the billing classification is discriminated on the basis of a dial signal, and wherein the result of the discrimination is sent from the exchange equipment on the ground to the movable object and in the form of a voice-band multi-frequency signal also serving as a response signal so that, on the basis of the voice-band signal, the billing condition is set to conduct the billing in the vehicle.

A further object of this invention is to construct, at extremely low cost, means required for counting up the charge and for setting the billing condition.

DESCRIPTION OF THE PREFERRED EMBODIMENTS

Figure 1:
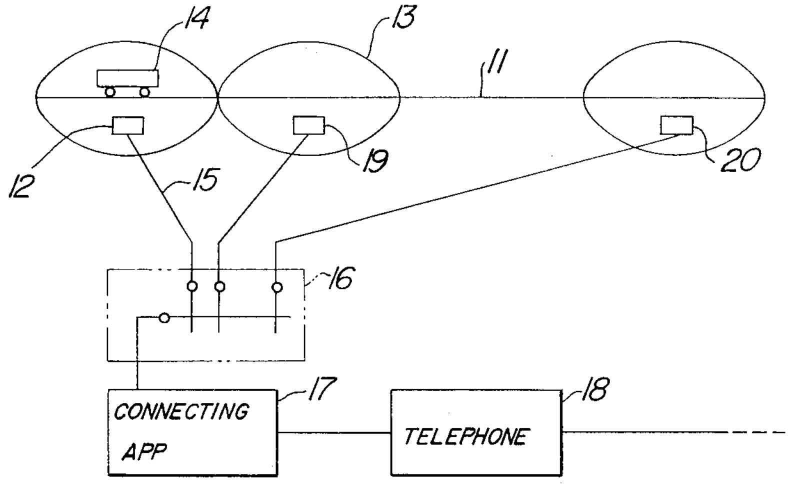
FIG. 1 is a diagram, partially in pictorial illustration, showing a mobile communication system between e.g. a coin-box telephone set carried on a train, and an ordinary telephone network.

FIG. 1 is a block diagram which shows a system forming one embodiment of this invention. In the figure, numeral 11 designates a route along which a vehicle 14 travels. Represented at 13 is an area allotted to electromagnetic waves being radiated by a radio station 12. Numeral 15 represents a relay line between the radio station 12 and exchange equipment 16 for the mobile communication. Apparatus 17 serves for connection between the exchange equipment 16 and telephone exchange network 18 of the type used for general subscription telephone service. Shown at 19 and 20 are other radio stations.

According to a conventional system, a signal indicating the particular radio-station area in which the vehicle 14 is traveling (hereinbelow termed "a zone discriminating signal") is continuously sent from the vehicle 14 in the form of an out-band signal in the talking condition. Transfer of the moving object to another radio-station area (hereinafter termed "a zone") is discriminated in the switch-board 16, whereupon the connection is altered. In order to avoid the cross modulation or intermodulation between the electric waves radiated from the movable object and to secure the service after the zone transfer, several zones before and after the particular zone in the service are blocked. In case where, in such a system, billing (collection of the fee for a telephone call) is automatically conducted in a telephone set (a coin-box telephone set) installed in the vehicle, instantaneous interruptions at a weak electric field and at the zone transfer are unavoidable and the probability of the service interruption is higher than in the stationary communication, with the result that in contrast to the ordinary public telephone system, there are, for example, more occurrences of incapability of receiving a signal for the billing and performance of the billing when communication in one direction is impossible.

Figure 3:
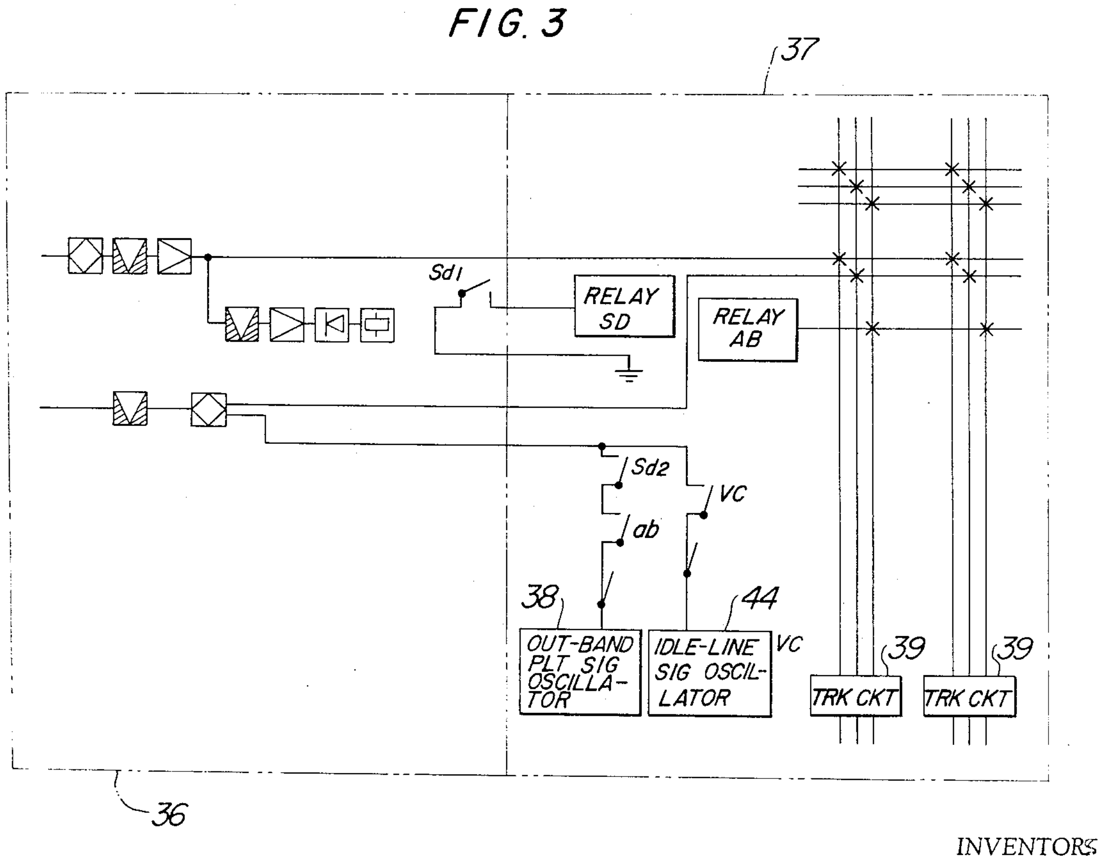
FIG. 3 is a detailed diagram, in block, of the carrier terminal station section embodying this invention.
Figure 2:
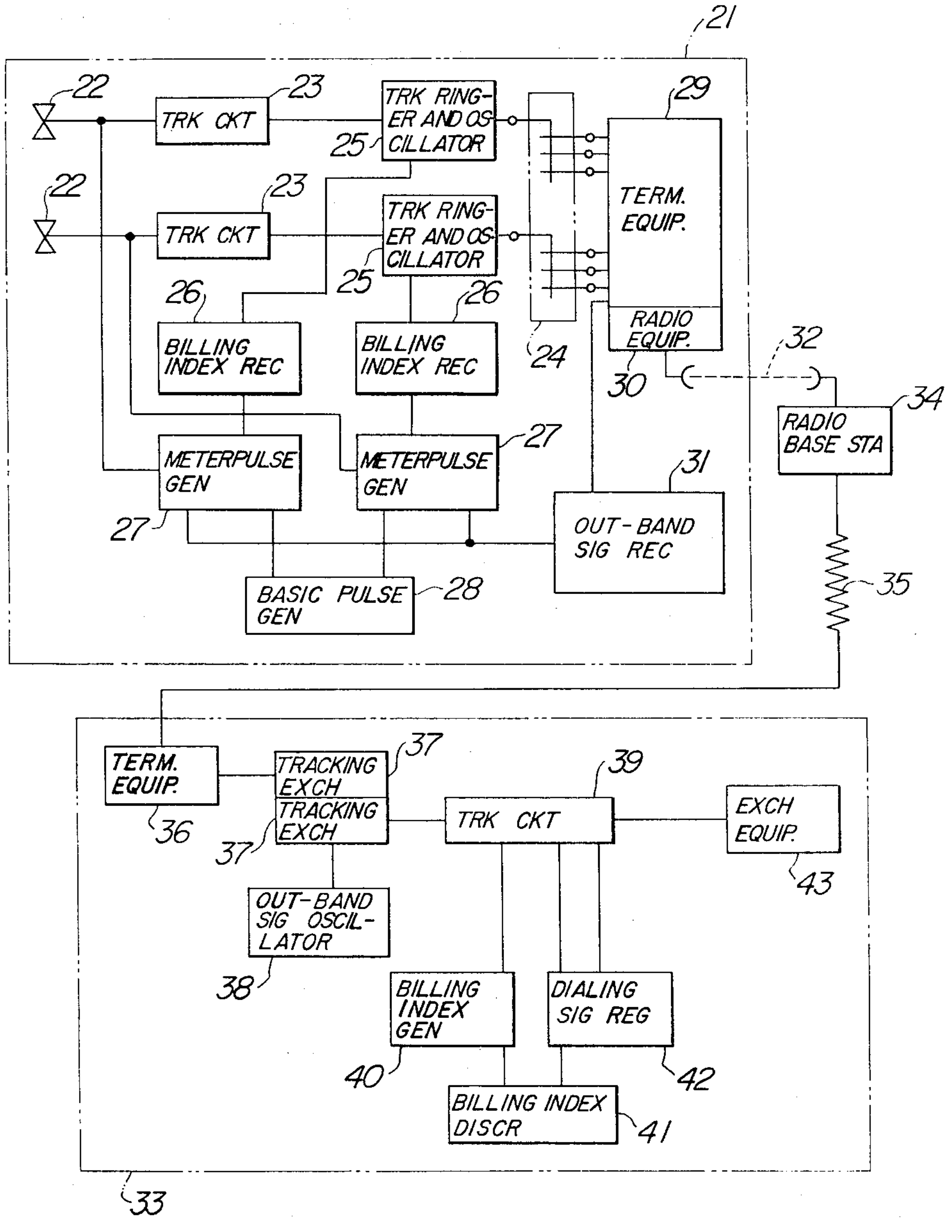
FIG. 2 is a block diagram of apparatus embodying this invention.

This invention eliminates these disadvantages, and thereby intends to avoid to the utmost the collection of an unreasonable charge to the user. Referring now to FIGS. 2 and 3, the invention will be described in detail.

FIG. 2 is a block diagram showing an embodiment of this invention. Shown at 21 is the equipment provided at a mobile station. It comprises coin box telephones 22, trunk circuits 23, links 24, trunk ringer and oscillator circuits 25, billing index receivers 26, meterpulse generators 27, a basic pulse generator 28, a carrier or terminal equipment 29, a radio equipment 30, and an outband signal receiver 31.

Shown at 34 is a radio base station, which comprises a radio equipment and a carrier-frequency terminal equipment.

Shown at 33 is an exchange station. It comprises a terminal equipment 36, a tracking exchange section 37, an out-band signal oscillator 38, a trunk circuit 39, a billing index generator 40, a billing index discriminator 41, a dialing signal register 42 of a sender, and an ordinary exchange equipment 43.

In operation, when a caller raises the handset of the telephone 22 in the mobile office 21, connection will be made to the ordinary exchange equipment 43 in a well-known way. More specifically, when hook-off is detected in the trunk circuit 23, the link 24 will be started to select an idle channel of the terminal equipment 29 thus to provide connection therewith. Upon connection with the idle channel, the trunk circuit 23 sends through the trunk ringer and oscillator circuit 25 a radio wave and a signal modulated by the radio wave necessary for connection with the exchange 33. The radio wave is received in the radio base station 34 via the radio equipment 30 and a radio circuit 32. Further, it is delivered to the exchange office 33 via an approach circuit 35. In the exchange 33, the terminal equipment 36 is first started to extend the connection via the tracking exchange section 37 to the trunk circuit 39. The signal sent from the mobile station is demodulated in the radio base station 34, transmitted to the exchange 33, and is discriminated in the trunk circuit 39 to be an originating call from the mobile station 21. Herein, according to a well-known system, connection is immediately made through the switch-board or the ordinary exchange equipment 43 to a switch-board. Then, the number of the called subscriber is dialed by manipulation by an operator. In contrast, according to the system of this invention, connection is provided from the trunk circuit 39 to the dialing signal register 42 of the sender, whereby a trunk tone is sent from the register sender 42 along a path reverse to the above-described one. When the caller in the mobile station hears the trunk tone, he will dial the number of a desired, called party. The dialed number is converted into a multifrequency signal in the trunk circuit 23 and the trunk ringer and oscillator circuit 25. The multifrequency signal is received and stored in the register sender 42 of the exchange office 33. When the register sender 42 receives a predetermined number of multifrequency signals, the common exchange equipment 43 will be started through the trunk circuit 39. Then, a dialing signal is sent in accordance with an ordinary signaling system using DC pulses, multifrequency signals, etc.

In this case, it is also possible that the dial signal sent from the mobile station is directly received by the ordinary exchange equipment 43. In order to prevent influence of instantaneous interruptions etc., however, any signal between the mobile station and the exchange station should be sent for a longer period in comparison with common signals. It is accordingly more desirable to once perform the conversion in the exchange 33 without providing a special, signal receiver in the ordinary exchange equipment.

The register sender 42 also sends the upper-place digit or digits of the dialed number of the called subscriber to the billing index discriminator 41, in which the zonal classification which determines the charge for a telephone call is discriminated. Upon reception of a response signal of the called party from the trunk circuit 23, the billing index discriminator 41 controls the billing index generator 40 to send to the mobile station 21 zonal information and a response signal based on a combination of in-band frequencies.

In the mobile station 21, the information is received in the billing index receiver 26 through the trunk ringer and oscillator circuit 25. Then, signal pulses from the basic pulse generator 28 are counted for the billing on the basis of the information.

In this case, the out-band signal sent from the mobile station 21 is present, and the connection of the switch-board 37 is maintained. Hence, an out-band pilot signal is sent from the out-band signal oscillator 38. Therefore, while the out-band pilot signal (hereinbelow, simply termed the "pilot signal") is not being received by the out-band pilot signal receiver 31 in the mobile station 21, the meterpulse generator 27 is controlled by the receiver 31 to stop the time measurement for the billing. (Generally speaking, the pilot signal is always being sent, and is used only for supervision of the circuit in one direction.)

The out-band pilot signal oscillator 38 is, of course, arranged so that it is stopped by a clearing signal (in-band signal) owing to the caller's hook-on at the mobile station and the called party's hook-on the ground.

FIG. 3 is a circuit diagram which shows parts of the switch-board 37 of the exchange equipment 33 for the mobile service and of the carrier-frequency terminal equipment 36 constituting a relay line. In the circuit arrangement, a relay SD receives the zone designation signal, while a relay AB indicates that the connection of the switch-board 37 is made. Numeral 38 represents the above-mentioned out-band pilot signal oscillator. Shown at 44 is a disengaged-line signal oscillator which sends a signal in order to indicate that the circuit is idle. Marks * are cross points for connection.

In operation, when a zone designation signal being sent from the mobile station 21 during talking is received at the terminal equipment 36 of the exchange equipment 33 for the mobile service, the zone designation signal receiving relay SD will operate to self-hold through its contact $sd_1$ and simultaneously to connect the out-band pilot signal oscillator 38 with the terminal equipment 36 through its other contact $sd_2$. Only where the connection of the switch-board 37 is provided, a contact ab of the relay AB is closed if the relay AB for monitoring the above condition is operative. Thus, the pilot signal is transmitted from the oscillator 38 through the terminal equipment 36 to the mobile station 21. Only in case where this signal is received at the mobile station 21, i.e., where the connection is perfect, the aforesaid billing control 27 is kept operative to effect the billing.

As described above, according to this invention, a signal outside the message band and a dial signal both being sent from a movable object are received and a connecting path of an exchange equipment on the ground is completed, whereupon an out-band signal and an in-band multifrequency signal serving also as a response signal are sent from the exchange equipment on the ground, whereby only while these signals are being received, measurement of time and billing are performed and the billing condition is set in the movable object. As a result, even in the mobile service telephone which is low in reliability when compared with the ordinary stationary telephone, a highly reliable billing is ensured. In addition, the system of this invention is very simple in construction, and may be constructed at low cost.

We claim:

1. In a telephone system for effecting communication between a mobile station and a fixed exchange station through a radio link, a billing system comprising pulse generator means in said mobile station for generating timing pulses providing a time measurement, billing index means in said mobile station responsive to said timing pulses for effecting said time measurement, out-band signal generating means in said exchange station responsive to receipt of a connection signal from said mobile station for sending an out-band signal to said mobile station, and meterpulse generator means in said mobile station for connecting said pulse generator means to said billing index means only when receiving said out-band signal.

2. The system defined in claim 1 wherein said mobile station includes trunk circuit means for sending said connection signal to said exchange equipment upon detection of answer supervision by the called subscriber.

3. The system defined in claim 1 wherein said exchange station further includes multifrequency in-band signaling means for sending to said mobile station a multifrequency in-band signal representing zonal information concerning the called subscriber for purposes of charge determination, said billing index means being responsive to said multifrequency in-band signal and said timing pulses for determining the charge for the call.

* * * * *